(12) United States Patent
Ichikawa

(10) Patent No.: US 11,281,414 B2
(45) Date of Patent: Mar. 22, 2022

(54) NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

(71) Applicant: Brother Kogyo Kabushiki Kaisha, Nagoya (JP)

(72) Inventor: Yushi Ichikawa, Chita-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/189,342

(22) Filed: Mar. 2, 2021

(65) Prior Publication Data

US 2021/0279020 A1    Sep. 9, 2021

(30) Foreign Application Priority Data

Mar. 4, 2020   (JP) .............................. JP2020-036682

(51) Int. Cl.
*G06F 3/12* (2006.01)
*H04N 1/00* (2006.01)

(52) U.S. Cl.
CPC .......... *G06F 3/1258* (2013.01); *G06F 3/1204* (2013.01); *G06F 3/1297* (2013.01); *H04N 1/00427* (2013.01); *H04N 1/00482* (2013.01)

(58) Field of Classification Search
CPC combination set(s) only.
See application file for complete search history.

(56) References Cited

U.S. PATENT DOCUMENTS

| 2004/0017580 | A1* | 1/2004 | Kuroda | G06F 3/1204 358/1.13 |
| 2014/0029033 | A1* | 1/2014 | Takahashi | G06F 3/1257 358/1.13 |
| 2019/0068808 | A1* | 2/2019 | Nakamura | G06F 3/1202 |
| 2020/0293240 | A1* | 9/2020 | Chew | G06F 3/1258 |
| 2021/0334613 | A1* | 10/2021 | Kanai | G06K 15/002 |

FOREIGN PATENT DOCUMENTS

JP    2009-295070 A    12/2009

* cited by examiner

*Primary Examiner* — Helen Zong
(74) *Attorney, Agent, or Firm* — Burr & Brown, PLLC

(57) ABSTRACT

A non-transitory storage medium stores a plurality of instructions readable by a computer of an information processing apparatus. The plurality of instructions cause the information processing apparatus to display a first setting screen on a user interface of the information processing apparatus as a setting screen without displaying a second setting screen in response to receipt of a first displaying instruction for displaying the setting screen, and display the second setting screen on the user interface instead of the first setting screen in response to receipt a second displaying instruction for displaying the second setting screen through the user interface while the first setting screen is displayed. The first setting screen is a setting screen capable of receiving a print parameter of a first item of a plurality of setting items and incapable of receiving a print parameter of a second item of the plurality of setting items.

16 Claims, 7 Drawing Sheets

NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

CROSS REFERENCE TO RELATED APPLICATION

The present application claims priority from Japanese Patent Application No. 2020-036682, which was filed on Mar. 4, 2020, the disclosure of which is herein incorporated by reference in its entirety.

BACKGROUND

A technical field disclosed in the specification relates to a non-transitory storage medium storing a plurality of instructions readable by a computer of an information processing apparatus that receives inputs of print parameters and the information processing apparatus.

There have been known a technique in which a setting screen that receives inputs of print parameters is displayed and a printer is instructed to execute printing based on the received print parameters in an information processing apparatus such as a personal computer. For example, there is disclosed a technique in which a printer driver that controls a rolled-paper printer which allows the information processing apparatus to display a dialog box for receiving print parameters including a sheet size.

SUMMARY

Since multi-functionality is secured in a program that controls the printer applicable to printing on standard size sheet such as A4 paper, many items are set on the setting screen thereof. In a case where printing on particular paper such as rolled-paper is further executed by the program, setting items for printing on the particular paper are added to the existing setting screen; therefore, the setting screen tends to be complicated and it becomes difficult for a user to intuitively execute the operation.

An aspect of the disclosure relates to a non-transitory storage medium storing a plurality of instructions that receives inputs of print parameters and improves user-friendliness for settings at the time of executing printing on particular paper.

In one aspect of the disclosure, a non-transitory storage medium stores a plurality of instructions readable by a computer of an information processing apparatus. When executed by the computer, the plurality of instructions cause the information processing apparatus to display a first setting screen on a user interface of the information processing apparatus as a setting screen without displaying a second setting screen in response to receipt of a first displaying instruction for displaying the setting screen that receives inputs of print parameters through an operating system of the information processing apparatus, and display the second setting screen on the user interface instead of the first setting screen in response to receipt a second displaying instruction for displaying the second setting screen through the user interface while the first setting screen is displayed. The first setting screen is a setting screen capable of receiving a print parameter of a first item of a plurality of setting items that relate to the print parameters and incapable of receiving a print parameter of a second item of the plurality of setting items. The second setting screen is a setting screen capable of receiving the print parameter of the first item and the print parameter of the second item of the plurality of setting items. The print parameter of the first item is used for generating printing data used for particular printing different from standard printing and is not used for generating printing data used for the standard printing. The print parameter of the second item is not used for generating the printing data used for the particular printing and is used for generating the printing data used for the standard printing. The printing data used for the particular printing is generated by using the print parameter of the first item receivable on the first setting screen.

In another aspect of the disclosure, an information processing apparatus includes a user interface including a display device, a memory, and a computer. The computer is configured to display a first setting screen on a user interface of the information processing apparatus as a setting screen without displaying a second setting screen in response to receipt of a first displaying instruction for displaying the setting screen that receives inputs of print parameters through an operating system of the information processing apparatus, and display the second setting screen on the user interface instead of the first setting screen in response to receipt a second displaying instruction for displaying of the second setting screen through the user interface while the first setting screen is displayed. The first setting screen is a setting screen capable of receiving print parameters of a first item of a plurality of setting items that relate to the print parameters and incapable of receiving print a parameter of a second item of the plurality of setting items. The second setting screen is a setting screen capable of receiving the print parameter of the first item and the print parameter of the second item of the plurality of setting items. The print parameter of the first item is used for generating printing data used for particular printing different from standard printing and is not used for generating printing data used for the standard printing. The print parameter of the second item is not used for generating the printing data used for the particular printing and is used for generating the printing data used for the standard printing. The printing data used for the particular printing is generated by using the print parameter of the first item receivable on the first setting screen.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment embodying a program will be explained in detail with reference to the attached drawings. The embodiment discloses the program executed in a personal computer (hereinafter referred to as "PC") connectable to a printer as a device having a printing function.

Figure 1:
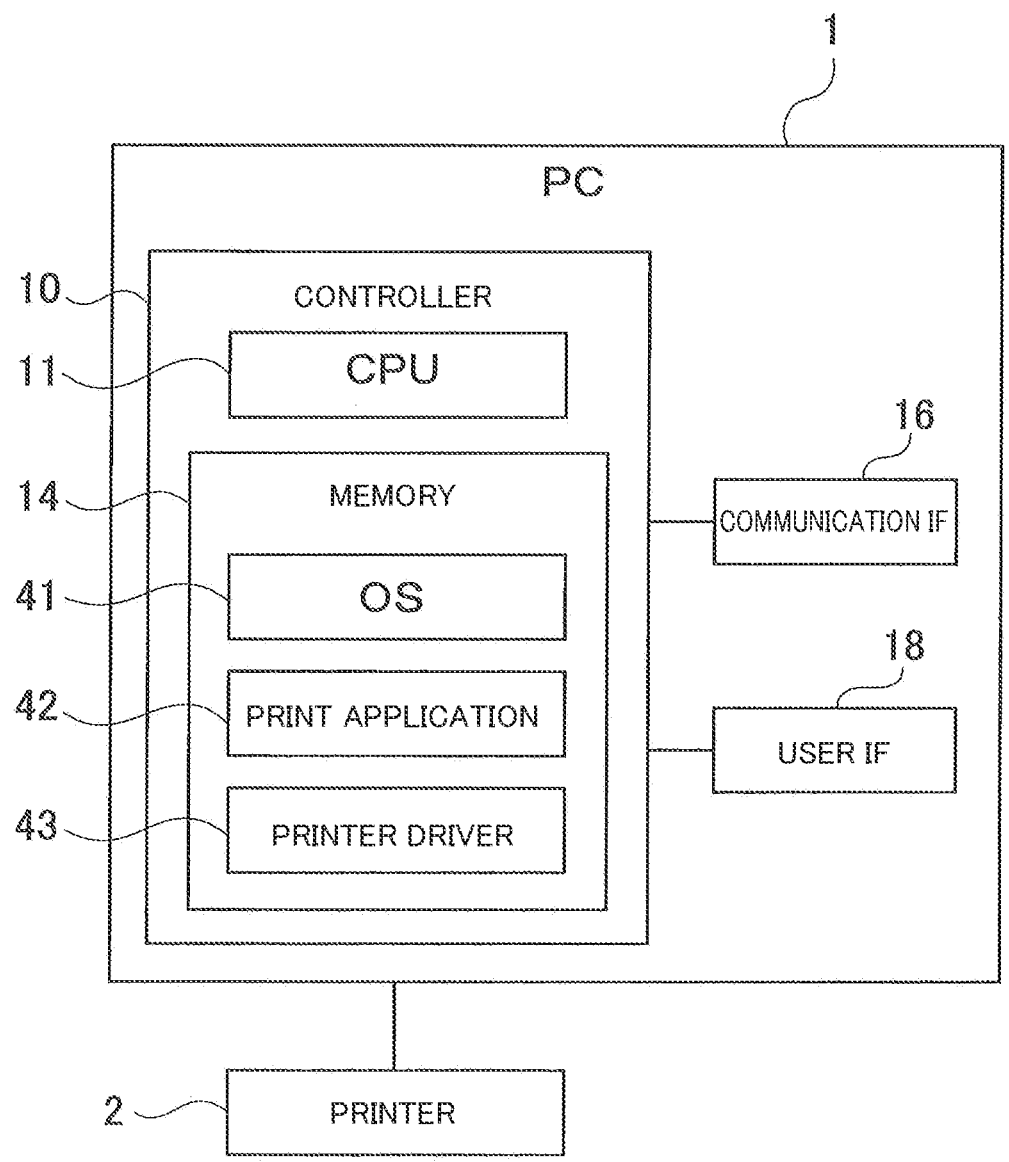
FIG. 1 is a schematic configuration diagram of a PC according to an embodiment.

A PC 1 according to the embodiment is connected to a printer 2 so as to communicate with each other, for example, as illustrated in FIG. 1. The PC 1 is an apparatus capable of executing various application programs (hereinafter referred to as "applications") for allowing the printer 2 to execute various functions. The PC 1 is an example of an information processing apparatus. For example, a smartphone or a tablet computer may be used instead of the PC 1.

The printer 2 according to the embodiment is a device at least having a printing function configured to print an image onto a printing medium and a communication function configured to execute communication with the PC 1. The printing medium is not limited to paper but may be cloth, a film and the like. Hereinafter, the size of the printing medium is referred to merely as a "sheet size". In the sheet size, the size in a conveying direction of the printing medium in the printer 2 is referred to as a "sheet height, and the size in a direction orthogonal to the conveying direction of the printing medium in the printer 2 is referred to as a "sheet width".

The printer 2 according to the embodiment includes a permanent supply tray for placing cut paper with standard sheet sizes (such as international standard A size and U.S. standard letter) so as to be fed, and detachable supply trays are also mountable. Then, as the detachable supply trays, a rolled paper tray for placing rolled paper so as to be fed and a banner paper tray for placing long cut paper (i.e., banner paper) so as to be fed are mountable on the printer 2. The printer 2 is a device capable of executing printing on the rolled paper or the long cut paper by mounting the rolled paper tray or the banner paper tray. The printing on the rolled paper or the long cut paper is an example of a particular printing. The printing on cut sheets with standard sizes, namely, standard size sheets is an example of a standard printing.

The banner paper has a size difficult to place on the permanent supply tray so as to be fed for the reason such that the sheet height is extremely longer than the sheet width, or a ratio of the sheet height with respect to the sheet width is higher than the standard size. The printer 2 may further have a multipurpose tray capable of placing both the standard size sheet and the banner paper so as to be fed.

The rolled-paper is paper wound in a roll state. The printer 2 can execute printing while unwinding and feeding the rolled paper by mounting the rolled paper tray. The printer 2 according to the embodiment may mount a cutter for cutting and discharging a printed part as an option of the rolled paper tray. The rolled paper and the banner paper are collectively called "long paper" in the following description.

The PC 1 includes a controller 10 having a CPU 11 and a memory 14 as illustrated in FIG. 1. The PC 1 also includes a communication interface (hereinafter referred to as "communication IF") 16 and a user interface (hereinafter referred to as "user IF") 18, and the communication IF 16 and the user IF 18 are electrically connected to the controller 10. The controller 10 in FIG. 1 is a general term used when hardware and software used for controlling the PC 1 are collectively called, which does not always represent single hardware existing in the PC 1.

The CPU 11 executes various processing in accordance with programs read out from the memory 14 or based on operations by a user. The CPU 11 is an example of a computer. The memory 14 is, for example, an HDD or a flash memory, which is used as an area storing various programs, data such as image data and document data, and various settings. A buffer provided in the CPU 11 is also an example of the memory.

An example of the memory may be a storage medium readable by a computer. The storage medium readable by the computer is a non-transitory medium. The non-transitory media include a recording medium such as CD-ROM and a DVD-ROM. The non-transitory medium is also a tangible medium. On the other hand, an electrical signal that carries programs downloaded from a server or the like on Internet is a signal medium readable by the computer, which is a kind of media readable by the computer; however, the signal medium is not included in the storage media which is non-transitory and is readable by the computer.

The communication IF 16 includes hardware for communicating with external devices such as the printer 2. A communication system of the communication IF 16 may be either of wireless or wired communication. Any system of standards such as Wi-Fi (registered trademark), Bluetooth (registered trademark), USB, and LAN may be used, and the system may include configurations of a plurality of systems.

The user IF 18 includes hardware configured to display information on a screen and hardware configured to receive input operations by the user. The user IF 18 may be a combination of a display for executing display and a keyboard or a mouse, or may be a touch panel having a display function and an input receiving function. The user IF 18 includes an example of a display device.

In the memory 14 of the PC 1 according to the embodiment, an operating system (hereinafter referred to as "OS") 41, a print application 42 and a printer driver 43 are incorporated as illustrated in FIG. 1. The OS 41 is, for example, Windows (registered trademark), mac OS (registered trademark), iOS (registered trademark), Android (registered trademark), or Linux (registered trademark). The printer driver 43 is an example of a plurality of instructions.

The print application 42 is a program that receives various instructions relating to printing. The print application 42 receives, for example, a designation of a device allowed to execute printing, a designation of an image to be printed, an instruction for editing print parameters and an instruction for executing printing. The print application 42 may further receive designations of a type and the size of sheet used for printing, a designation of the number of copies, an instruction for double-sided printing, and the like The printer driver 43 is a program conforming to a model of the printer 2, and the printer driver 43 controls the operation of the printer 2 by communicating with the printer 2. The printer driver 43 is started up, for example, when the instruction for executing printing or the instruction for editing print parameters is received in a state in which the printer 2 is designated by the print application 42 or the like, when an instruction for setting properties of the printer 2 is received, and when the inquiry about abilities of the printer 2 is received.

The printer driver 43 receives the instructions for editing the detailed print parameters relating to printing in the printer 2, and the instructions include, for example, selection of the type and size of paper as the printing medium, registration of a user definition size as the sheet size, a designation of print quality, and selection of the supply tray or a sheet output tray. When the printer driver 43 receives a printing job from the OS 41, the printer driver 43 generates print data based on image data and print parameters designated in the printing job.

The print parameters received by the printer driver 43 include a plurality of setting items. As the items of printing parameters, there are items used for generating print data used for printing on the long paper and not used for generating print data used for printing on standard size sheet (hereinafter referred to as "items only for long paper"), items not used for generating print data used for printing on the long paper and used for generating print data used for printing on the standard size sheet (hereinafter referred to as "items only for a standard size"), and items used both for generating print data used for printing on the long paper and for generating print data used for standard size sheet (hereinafter referred to as "items for both sizes"). The items for long paper correspond to an example of first items, items for standard size correspond to an example of second items and items for both sizes corresponds to an example of third items.

Specifically, as the item only for the long paper, for example, a cut option exists. The cut option is an item that receives a designation of automatic cutting which allows the cutter to operate automatically. There are, for example, automatic cutting, half cutting, and "off" as parameters selectable in the item of the cut option. As items only for the standard size, for example, there are double-sided printing, layout printing, and enlarged/reduced printing. The printer 2 is incapable of executing double-sided printing on the long paper due to a structure thereof. It is rare that instructions for executing printing with enlargement/reduction such as layout printing or poster printing or printing with sorting of the order of pages are received in the printing onto the long paper. As items for both sizes, for example, there are a designation of print quality, a designation of color/gray scale printing, the supply tray, and the sheet size.

The printer driver 43 according to the embodiment is a program applicable to both printing on the standard size sheet and printing on the long paper. That is, the printer driver 43 receives all designations of items only for the long paper, items only for the standard size and items for both sizes. For example, when the rolled-paper tray is mounted to the printer 2, it is possible to select the rolled-paper tray and to instruct printing on the rolled paper by using the printer driver 43.

Information of sheet sizes that receives selection by the printer driver 43 according to the embodiment includes information of sheet names with standard sizes provided by the printer driver 43 in advance and information of sheet with a user definition size defined and registered by the user. The sheet names with standard sizes are, for example, A4, 10×15 cm, A5, A6, Letter, Legal, A3, and Ledger. These sheet names are set in the printer driver 43 in advance with information of corresponding respective sheet sizes as choices of sheet sizes. The sheet names with standard sizes are choices of precut sheet which is paper precut into prescribed sizes.

On the other hand, information of sheet with the user definition size is a pair of information of a sheet name and information of a sheet size defined by the user. The information of sheet with the user definition size is not provided by the printer driver 43 in advance but can be selected from the printer driver 43 after being defined by the user. When executing printing on the long paper, it is necessary to select the sheet size not from the sheet names with standard sizes but from sheet with the user definition size. In the case of sheet with standard sizes, both the sheet width and the sheet height are set only by selecting the sheet name; however, it is necessary to respectively set the sheet width and the sheet height in the case of sheet with the user definition size. The banner paper in the long paper is an example of particular precut paper. It is preferable that sheet sizes of the banner paper and the rolled-paper are prepared in advance by a printer manufacturer. It is also preferable that there is a choice in which only the sheet width is prepared to be selected and the sheet height is not fixed.

In print parameters used when executing printing on the long paper, settings different from print parameters used when executing printing on the standard size sheet are necessary in many cases. Accordingly, the printer driver 43 according to the embodiment includes a standard-sheet setting screen that receives items only for the long paper, items only for the standard size and items for both sizes, and a long-paper screen that receives items only for the long paper and a part of items for both sizes, do not receive items only for the standard size as setting screens that receives inputs of print parameters. Note that all items for both sizes may be received on the long-paper screen. The printer driver 43 displays any one of the standard-sheet setting screen and the long-paper setting screen that receive inputs of print parameters on the setting screen that is displayed. The standard-sheet setting screen is an example of a second setting screen and the long-paper setting screen is an example of a first setting screen.

Figure 2:
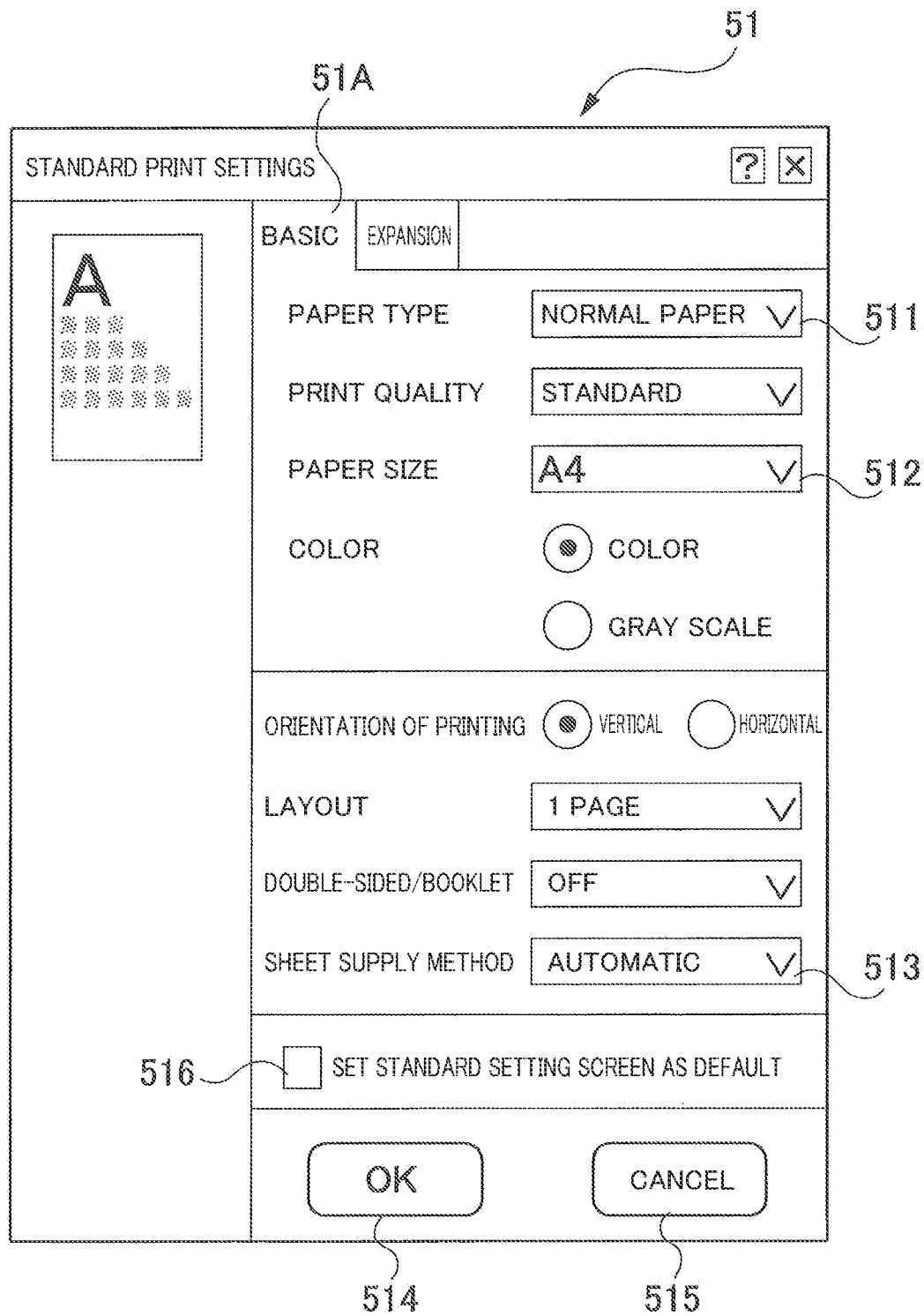
FIG. 2 is an explanatory view illustrating an example of a standard-sheet setting screen.
Figure 3:
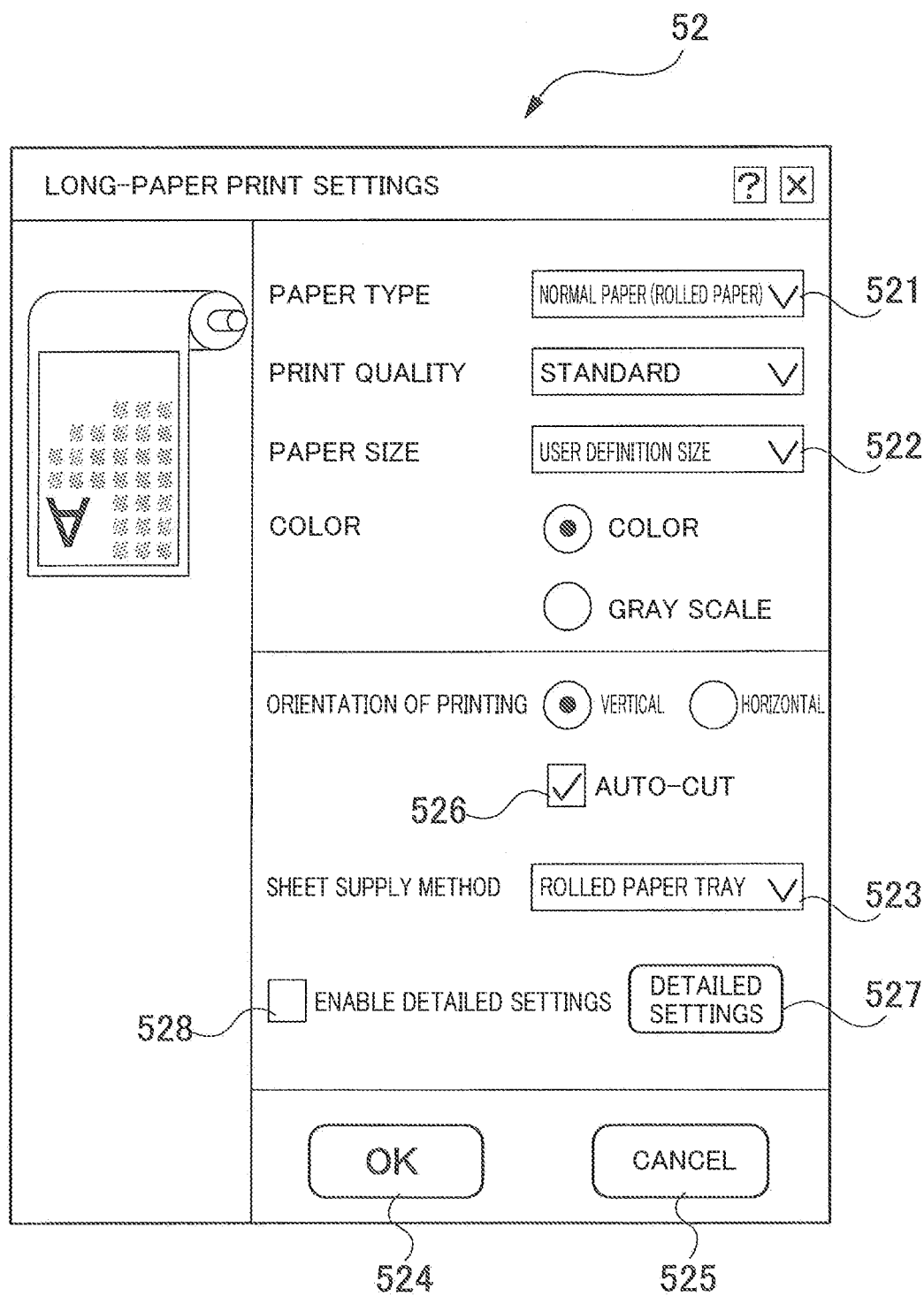
FIG. 3 is an explanatory view illustrating a long-paper setting screen.

Respective setting screens will be explained. An example of the standard-sheet setting screen is illustrated in FIG. 2 and an example of the long-paper setting screen is illustrated in FIG. 3, respectively. A standard-sheet setting screen 51 illustrated in FIG. 2 is a screen capable of setting all items receivable in the printer 2 as print parameters. The number of items receivable on the standard-sheet setting screen 51 is larger than that of the long-paper setting screen. Accordingly, a plurality of tabs such as "basic", "expansion" and the like are provided on the standard-sheet setting screen 51, and the printer driver 43 receives switching of items to be displayed by the operation to the tabs. An example of a basic tab screen 51A which is an initial screen of the standard-sheet setting screen 51 for receiving editing of basic print parameters is illustrated in FIG. 2.

In the basic tab screen 51A illustrated in FIG. 2, a selection field for a paper type 511, a selection field for a sheet size 512, a selection field for a sheet supply method 513, an OK button 514, and a cancel button 515 are included. In the illustrated basic tab screen 51A, fields for receiving the designation of double-sided printing and the designation of expansion/reduction such as the layout printing are further included. Default choices of respective items in the standard-sheet setting screen 51 displayed at the time of starting correspond to standard size sheet. Specifically, "normal paper" is displayed in the selection field for the paper type 511, "A4" is displayed in the selection field for the sheet size 512, and "automatic" is displayed in the selection field for the sheet supply method 513 as default choices, respectively. The basic tab screen 51A is an example of an initial display manner.

The standard-sheet setting screen 51 further includes a check box 516. The check box 516 is an item that receives an instruction for causing the standard-sheet setting screen 51 to be a default state. The default setting screen of the printer driver 43 according to the embodiment is a later-described long-paper setting screen in the initial state just after installation. When an input that switches the default screen from the long-paper setting screen 52 to the standard-sheet setting screen 51 to the check box 516 is received, the printer driver 43 sets the default setting screen at the time of starting next time to the standard-sheet setting screen 51.

For example, when the operation to the expansion tab is received on the standard-sheet setting screen 51, an expansion tab screen as a screen different from the basic tab screen 51A is displayed. The standard-sheet setting screen 51 is a screen that receives, for example, the items only for the long paper by the expansion tab screen; however, a field for receiving items only for the long paper is not provided on the basic setting screen 51A. The expansion tab screen is a screen that receives settings of print parameters of items different from the items on the basic tab screen 51A (for example, secure printing), and the expansion tab screen includes the OK button 514, the cancel button 515, and the check box 516 in the same manner as the basic tab screen 51A. The screen whose display manner is changed by the operation to the tab is also included in the standard-sheet setting screen 51. That is, an operation received on the screen of the tab other than the basic tab screen 51A is also an operation to the standard-sheet setting screen 51.

It is also preferable that, for example, a tab for long paper is provided on the standard-sheet setting screen 51. A tab screen for the long paper as a screen displayed when receiving the operation to the tab for the long paper includes items only for the long paper, and the print driver 43 receives inputs of items only for the long paper as print parameters suitable for printing on the long paper in the tab screen for the long paper. In this case, the tab screen for the long paper is an example of a multi-item display manner.

In a case where the standard-sheet setting screen 51 includes the tab screen for the long paper, for example, settings of the same items as in the long-paper setting screen to be described later may be received in the tab screen for the long paper. The tab screen for the long paper differs from the long-paper setting screen in a point that receivable items can be switched by the operation to the tab. The operation to the tab screen for the long paper may be valid, for example, when the long paper is selected as the sheet size. That is, it is preferable that the operation to the tab for the long paper is received only when the long paper is selected as the sheet size. In a case where the sheet size is not the long paper at the time when the operation to the tab for the long paper is received, the instruction for changing the size or the instruction for cancellation is received, and then, in a case where the instruction for changing the sheet size to long paper is received, it is preferable that the tab for the long paper is displayed. When the operation to the tab for the long paper is received in a state in which the long paper is not selected as the sheet size, the tab screen for the long paper in which operations other than the change of the sheet size are not received (for example, in a state in which all other fields are grayed out) may be displayed.

A long-paper setting screen 52 illustrated in FIG. 3 is an example conforming to the printer 2 on which the rolled-paper tray is mounted. In the long-paper setting screen 52, a selection field for a paper type 521, a selection field for a sheet size 522, a selection field for a sheet supply method 523, an OK button 524, and a cancel button 525 are included in the same manner as in the standard-sheet setting screen 51. Default choices of respective items in the long-paper setting screen 52 correspond to the rolled paper. Specifically, "normal paper (rolled paper)" is displayed in the selection field for the paper type 521, "user definition size" is displayed in the selection field for the sheet size 522, and "rolled-paper tray" is displayed in the selection field for the sheet supply method 523 as default choices, respectively. In the case where there is the sheet size registered as the user definition size, the name thereof may be displayed in the selection field for the sheet size 522.

The fields for receiving items only for the standard size are not displayed in the long-paper setting screen 52, and the long-paper setting screen 52 differs from the standard-sheet setting screen 51. Specifically, the fields for receiving the designation of double-sided printing and the designation of expansion/reduction such as the layout printing are not provided in the long-paper setting screen 52. The number of items received in the long-paper setting screen 52 is smaller than that in the standard-sheet setting screen 51, and no tab is provided in the long-paper setting screen 52. It is also preferable that the designation of paper other than long paper, namely, the designation of standard size sheet is not received in the long-paper setting screen 52. It is also preferable that, when there is the supply tray capable of feeding only cut paper with standard sizes in the printer 2, the tray is not included in choices in the long-paper setting screen 52.

The long-paper setting screen 52 further includes a check box 526, a detail setting button 527, and a check box 528. The check box 526 is an item that receives an instruction for adding a command of automatic cutting to a print command transmitted to the printer 2. The check box 526 is the item selectable in a case where the printer 2 includes the cutter as the option of the rolled-paper tray and the selected paper is rolled paper. When the print command to which the command of automatic cutting is added is received, the printer 2 automatically drives the cutter after execution of printing to cut a printed part of the set rolled paper and discharges the paper.

The detail setting button 527 is a button of receiving an instruction for displaying the standard-sheet setting screen 51 as a setting screen that receives detailed settings. The printer driver 43 according to the embodiment displays the long-paper setting screen 52 as the default setting screen in the initial state in a case where the rolled-paper tray or the banner paper tray is mounted on the printer 2. When an operation to the detail setting button 527 is received in the long-paper setting screen 52, the printer driver 43 displays the standard-sheet setting screen 51.

The check box 528 is an item that receives an instruction for allowing the detailed settings received in the displayed standard-sheet setting screen 51 to be valid. The printer driver 43 according to the embodiment has a flag indicating whether the check box 528 is checked or not, namely, whether the detailed settings are valid or invalid. The flag is set so that the detailed settings are invalid in an initial state.

Next, processing by the printer driver 43 according to the embodiment will be explained. The following processing and respective processing steps of a flowchart basically indicate processing of the CPU 11 that follows commands described in respective programs. That is, processing such as "to decide", "to extract", "to select", "to calculate", "to determine", "to specify", "to obtain", "to receive", and "to control" in the following explanation indicate processing of the CPU 11. The processing by the CPU 11 also includes hardware control using an API of the OS 41 in the PC 1. In the specification, the description of the OS 41 is omitted and operations of respective programs will be explained. That is, a description saying that "a program B controls hardware C" may indicate that "the program B controls hardware C by using the API of the OS 41" in the following explanation. Moreover, processing of the CPU 11 that follows commands described in the program is described in simplified wording in some cases. For example, the description will be made such as "the CPU 11 executes . . . " and "the program executes . . . ."

Note that "to obtain" will be used in a concept that the request is not essential. That is, processing of receiving data without being requested by the CPU 11 is also included in a concept that "the CPU 11 obtains data". "Data" in the specification is represented by a bit string readable by the computer. Then, data having substantially the same contents in a different format will be dealt with as the identical data. The same applies to "information" in the specification. Moreover, "to request" and "to instruct" are concepts that information indicating the request and information indicating the instruction are outputted to the other party. The information indicating the request and the information indicating instruction may be written merely as "request" and "instruction".

Furthermore, processing of determining whether information A indicates that it is a matter B by the CPU 11 may be conceptually described such as "whether it is the matter B or not is determined from the information A". Processing of determining whether information A indicates that it is a matter B or a matter C may be conceptually described such as "whether it is the matter B or the matter C is determined from the information A".

Hereinafter, a procedure of print setting processing by the printer driver 43 according to the embodiment will be explained with reference to a flowchart of FIG. 4. The print setting processing is executed by the CPU 11 of the PC 1 when the printer driver 43 is started up by the application such as the print application 42 that receives an instruction for editing print parameters in a state in which the printer 2 is selected. When the printer driver 43 is started in advance, the print setting processing is executed when the application that receives the instruction for editing print parameters instructs the printer driver 43 to execute processing. The print setting processing is processing in which the standard-sheet setting screen 51 (see FIG. 2) or the long-paper setting screen 52 (see FIG. 3) is displayed and inputs to the displayed setting screen are received. The instruction for executing the print setting processing is an example of a first displaying instruction for displaying the setting screen.

In the print setting processing, the CPU 11 first obtains print parameters which have been selected (S101). The print parameters obtained at S101 correspond to an example of initial parameters. At the time of starting up the printer driver 43, the CPU 11 reads out print parameters stored in a storage area for the printer driver 43 in the memory 14 and stores the parameters in a prescribed data structure. The data structure is an area shared between an application such as the print application 42 and the printer driver 43, which may be edited by both the print application 42 and the printer driver 43. The data structure is an area temporarily used only during execution of the application such as the print application 42, which is discarded when the application ends. At S101, the CPU 11 reads out print parameters stored in the data structure. The CPU 11 executes editing by referring to the read print parameters in the following processing.

On the other hand, the storage area for the printer driver 43 is an area provided when the printer driver 43 is installed in the PC 1, and the storage area for the printer driver 43 is, for example, a registry or a configuration file. The storage area for the printer driver 43 is an area to be held regardless of the execution status of the printer driver 43 or the application such as the print application 42, and the storage area for the printer driver 43 is permanently used. When installing the printer driver 43, an installer of the printer driver 43, the OS 41, the printer driver 43 just after the installation and the like store various information in storage areas of the print driver 43. As information stored in the storage area for the printer driver 43, there are, for example, information of print parameters, model information, and information edited after the installation.

The model information is information indicating a model of the printer to be instructed to execute printing by the printer driver 43. The printer driver 43 may be a program conforming to, for example, a plurality of models in the same product series, and model information of the printer to be used (the printer 2 in the embodiment) is stored at the time of installing the printer driver 43. The printer driver 43 can recognize the model of the printer to be controlled based on information stored in the storage area for the printer driver 43. The printer driver 43 can determine whether the printer 2 can execute printing on the long paper or not and determine whether the cutter is mounted on the printer 2 as the option of the rolled paper tray or not based on the obtained model information.

The CPU 11 determines whether the printer 2 selected as a device allowed to execute printing can execute printing on the long paper or not based on the obtained model information and the like (S102). The CPU 11 determines YES at S102, for example, when the rolled paper tray or the banner paper tray is mounted on the printer 2. The CPU 11 may obtain information by executing communication with the printer 2.

When it is determined that the printing on the long paper is executable (S102: YES), the CPU 11 determines whether the default setting screen that receives print parameters is the standard-sheet setting screen 51 or not (S103). Information indicating the default setting screen is stored in the storage area for the printer driver 43, and the long-paper setting screen 52 is the default screen in the initial state. The printer driver 43 stores information of setting the standard-sheet setting screen 51 as the default screen in the storage area for the printer driver 43 when the input that switches the default screen from the long-paper setting screen 52 to the standard-sheet setting screen 51 to the check box 516 in the standard-sheet setting screen 51 is received as described above.

When it is determined that the default screen is not the standard-sheet setting screen 51 (S103: NO), the CPU 11 executes long-paper setting processing (S104). The long-paper setting processing is processing that receives various settings in the long-paper setting screen 52 illustrated in FIG. 3.

On the other hand, when it is determined that printing on the long paper is not executable (S102: NO), or when it is determined that the default screen is the standard-sheet setting screen 51 (S103: YES), the CPU 11 executes standard setting processing (S105). The standard setting processing is processing that receives various settings in the standard-sheet setting screen 51 illustrated in FIG. 2.

A procedure of the long-paper setting processing will be explained with reference to a flowchart of FIG. 5. In the long-paper setting processing, the CPU 11 first causes the user IF 18 to display the long-paper setting screen 52 (S201), and receives various inputs in the displayed screen. The CPU 11 displays the long-paper setting screen 52 based on print parameters obtained at S101 of the print setting processing.

The CPU 11 determines whether the operation to the detail setting button 527 has been received in the displayed long-paper setting screen 52 or not (S202). The operation to the detailed setting button 527 is an instruction for executing detailed settings of print parameters by displaying the standard-sheet setting screen 51.

When it is determined that the operation to the detail setting button 527 has not been received (S202: NO), the CPU 11 determines whether the operation to the check box 528, namely, the instruction for changing valid/invalid of detailed settings has been received or not (S203).

When it is determined that the instruction for changing valid/invalid of the detailed settings has not been received (S203: NO), the CPU 11 determines whether an input to another setting has been received or not (S204). When it is determined that another input has not been received (S204: NO), the CPU 11 determines whether the input to the OK button 524 has been received or not (S205). When it is determined that the input has not been received (S205: NO), the CPU 11 determines that the input to the cancel button 525 has been received or not (S206). When it is determined that the input has not been received (S206: NO), the CPU 11 returns to S202 and further receives various inputs.

When it is determined that the operation to the detail setting button 527 has been received (S202: YES), the CPU 11 executes the standard setting processing (S207). The standard setting processing is processing for receiving various settings by displaying the standard-sheet setting screen 51. The operation to the detail setting button 527 is an example of an operation of a second displaying instruction for displaying of the second setting screen. The standard setting processing executed at S207 of the long-paper setting processing is the same processing as the processing executed at S105 of the standard setting processing.

Figure 6:
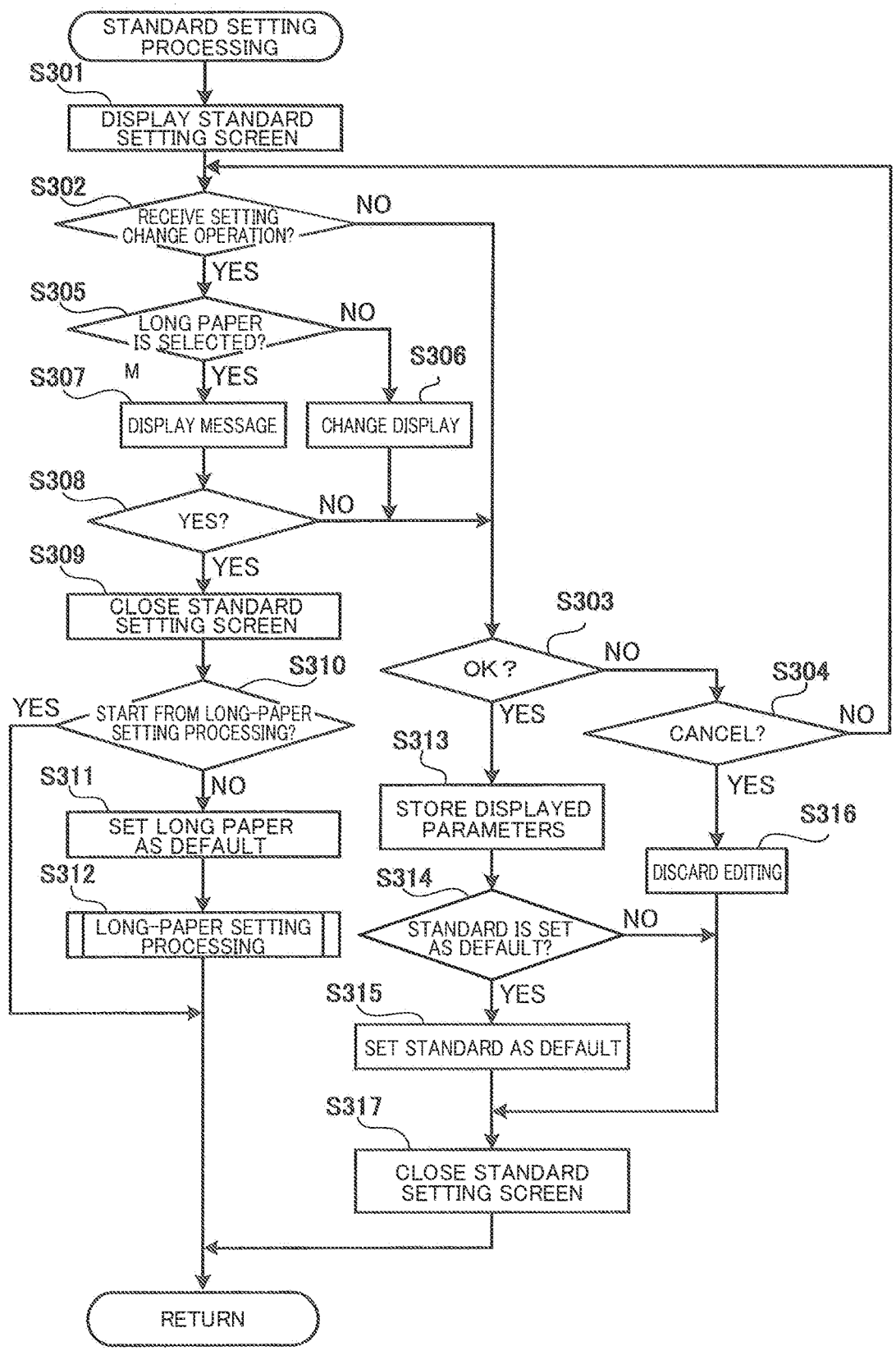
FIG. 6 is a flowchart illustrating a procedure of standard setting processing.

A procedure of the standard setting processing will be explained with reference to a flowchart of FIG. 6. In the standard setting processing, the CPU 11 first causes the user IF 18 to display the standard-sheet setting screen 51 (S301). In a case where the standard setting processing is executed from S207 of the long-paper setting processing, the CPU 11 displays the standard-sheet setting screen 51, for example, by superimposing the standard-sheet setting screen 51 on the long-paper setting screen 52 while displaying the long-paper setting screen 52, and the CPU 11 does not receive an operation to the long-paper setting screen 52. In a case where the standard setting processing is executed from S207 of the long-paper setting processing, print parameters displayed on the long-paper setting screen 52 may be displayed on the standard-sheet setting screen 51 at S301.

Then, the CPU 11 determines whether the operation of changing print parameters has been received on the standard-sheet setting screen 51 or not (S302). When it is determined that the change operation has not been received (S302: NO), the CPU 11 determines whether the input to the OK button 514 has been received on the standard-sheet setting screen 51 or not (S303). When it is determined that the input has not been received (S303: NO), the CPU 11 determines whether the input to the cancel button 515 has been received or not (S304). When it is determined that the input has not been received (S304: NO), the CPU 11 returns to S302 and further receives various inputs.

When it is determined that the operation of changing print parameters has been received (S302: YES), the CPU 11 determines whether the operation of selecting the long paper has been received or not (S305). The CPU 11 determines that the long paper has been selected when the selection instruction has been received in the selection field for the sheet size 512 and the sheet height of the selected sheet size is equal to or longer than a prescribed long length. The CPU 11 determines that the long paper has been selected also when the rolled paper is selected in the selection field for the paper type 511. The prescribed long length may be the maximum sheet height in sheet heights of cut paper with standard sizes included in the choices, may be a size obtained by adding a prescribed amount to the maximum sheet height, or may be a size obtained by multiplying the maximum sheet height by a prescribed number larger than "1".

When it is determined that the received operation is not the selection of the long paper (S305: NO), the CPU 11 changes the display contents on the displayed standard-sheet setting screen 51 in accordance with the received operation (S306). The CPU 11 changes the displayed screen based on the tab to which the operation has been received also when receiving the operation of switching the tab.

Figure 7:
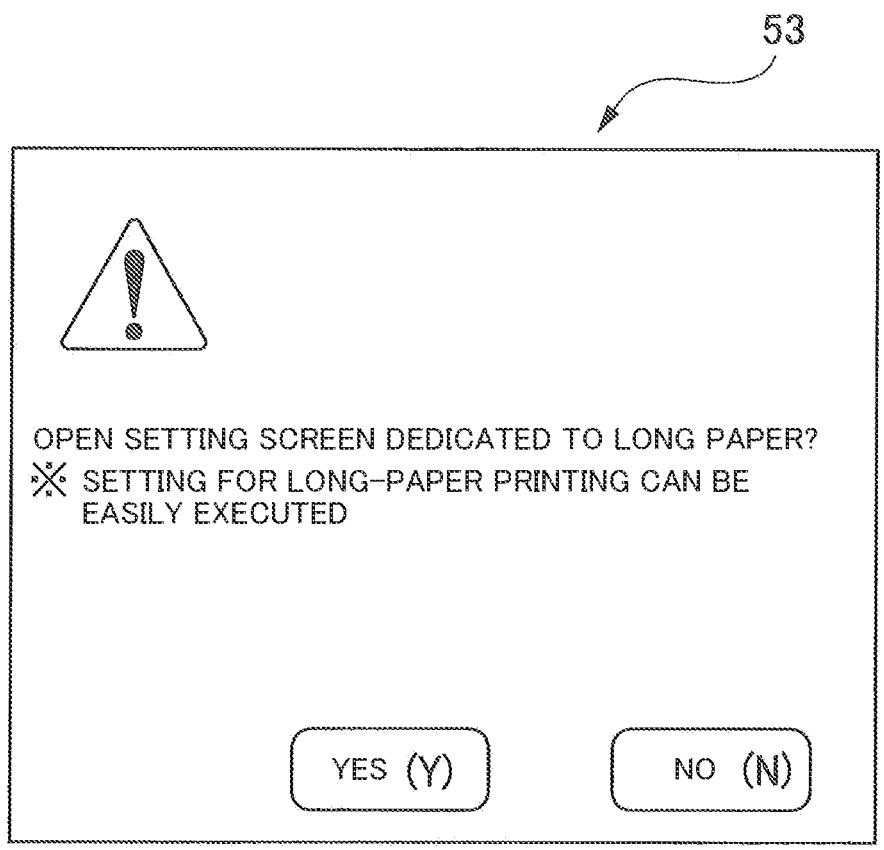
FIG. 7 is an explanatory view illustrating an example of a long-paper recommendation message.

When it is determined that the selection of the long paper has been received (S205: YES), the CPU 11 causes the user IF 18 to display a long paper recommendation message for recommending the use of the long-paper setting screen 52 (S307). An example of the long-paper recommendation message is illustrated in FIG. 7. In a long-paper recommendation message 53 illustrated in FIG. 7, an input of "YES" or "NO" is received.

The CPU 11 determines whether the input of "YES" has been received in the displayed long-paper recommendation message 53 or not (S308). After S306, or when it is determined that the input of "NO" has been received, not the input of "YES" in the displayed long-paper recommendation message 53 (S308: NO), the process proceeds to S303 and further receive the input to the displayed standard-sheet setting screen 51. When it is determined NO at S308, the CPU 11 deletes the long-paper recommendation message 53 and returns to the display of the standard-sheet setting screen 51. In this case, the selected state of other items in the standard-sheet setting screen 51 may be changed based on the received selection as the long paper has been selected. For example, when the rolled paper is selected in the selection field for the paper type 511, the selection field for the sheet supply method 513 may be changed to the "rolled paper tray".

When it is determined that the input of "YES" has been received in the long-paper recommendation message 53 (S308: YES), the CPU 11 closes the displayed long-paper recommendation message 53 and the standard-sheet setting screen 51 (S309).

Then, the CPU 11 determines whether the standard setting processing that is being executed is processing started from S207 of the long-paper setting processing by the instruction for detailed settings to the long-paper setting screen 52 or not (S310). When it is determined that the processing has been started from S105 of the print setting processing, not S207 of the long-paper setting processing (S310: NO), the CPU 11 sets the long-paper setting screen 52 as the default screen (S311). Specifically, the CPU 11 stores information indicating that the long-paper setting screen 52 is set as the default setting screen in the storage area for the printer driver 43. Accordingly, the long-paper setting screen 52 is displayed at the time of starting next time.

It is also preferable that the selection by the user whether the long-paper setting screen 52 is set as the default setting screen or not is received instead of S311. For example, a check box for receiving the instruction for setting the long-paper setting screen 52 as the default screen is provided in the long-paper recommendation message 53, and which screen is set as the default screen may be determined based on an input by the user.

After S311, the CPU 11 starts execution of the long-paper setting processing (S312) and ends the standard setting processing. In this case, the CPU 11 makes all settings to the items for both sizes received in the standard-sheet setting screen 51 in the standard setting processing valid as described later. Specifically, the CPU 11 executes the same processing as in a case where an operation of changing the check box 528 in the long-paper setting screen 52 from "without a check mark" to "with a check mark" is received.

When it is determined that the standard setting processing that is being executed is processing started from S207 of the long-paper setting processing (S310: YES), the CPU 11 ends the standard setting processing. When the standard setting processing is executed at S207 of the long-paper setting processing, the CPU 11 returns to the procedure of the long-paper setting processing by ending the standard setting processing.

On the other hand, when it is determined that an input to the OK button 514 has been received on the standard-sheet setting screen 51 (S303: YES), the CPU 11 temporarily stores print parameters displayed on the standard-sheet setting screen 51 in the memory 14 (S313). The CPU 11 stores print parameters of all items which are not only items displayed on the basic tab screen 51A of the standard-sheet setting screen 51 but also items to be received in other tab screens such as the expansion tab. As for items not receiving inputs, default settings are stored as they are. The print parameters are not determined at this point.

Then, the CPU 11 determines whether the check box 516 is checked or not, namely, whether the instruction for setting the standard-sheet setting screen 51 as the default screen has been received or not (S314). Checked or not checked to the check box 516 corresponds to an example of a start setting. When it is determined that the instruction for setting the standard-sheet setting screen 51 as the default screen has been received (S314: YES), the CPU 11 sets the standard-sheet setting screen 51 as the default screen (S315).

When it is determined that the input to the cancel button 515 has been received on the standard-sheet setting screen 51 (S304: YES), the CPU 11 discards editing received in the standard-sheet setting screen 51 (S316). The CPU 11 restores print parameters to the state displayed at S301. After S315 of S316, or when it is determined that the instruction for setting the standard-sheet setting screen 51 as the default screen has not been received (S314: NO), the CPU 11 closes the standard-sheet setting screen 51 (S317), and ends the standard setting processing.

Figure 4:
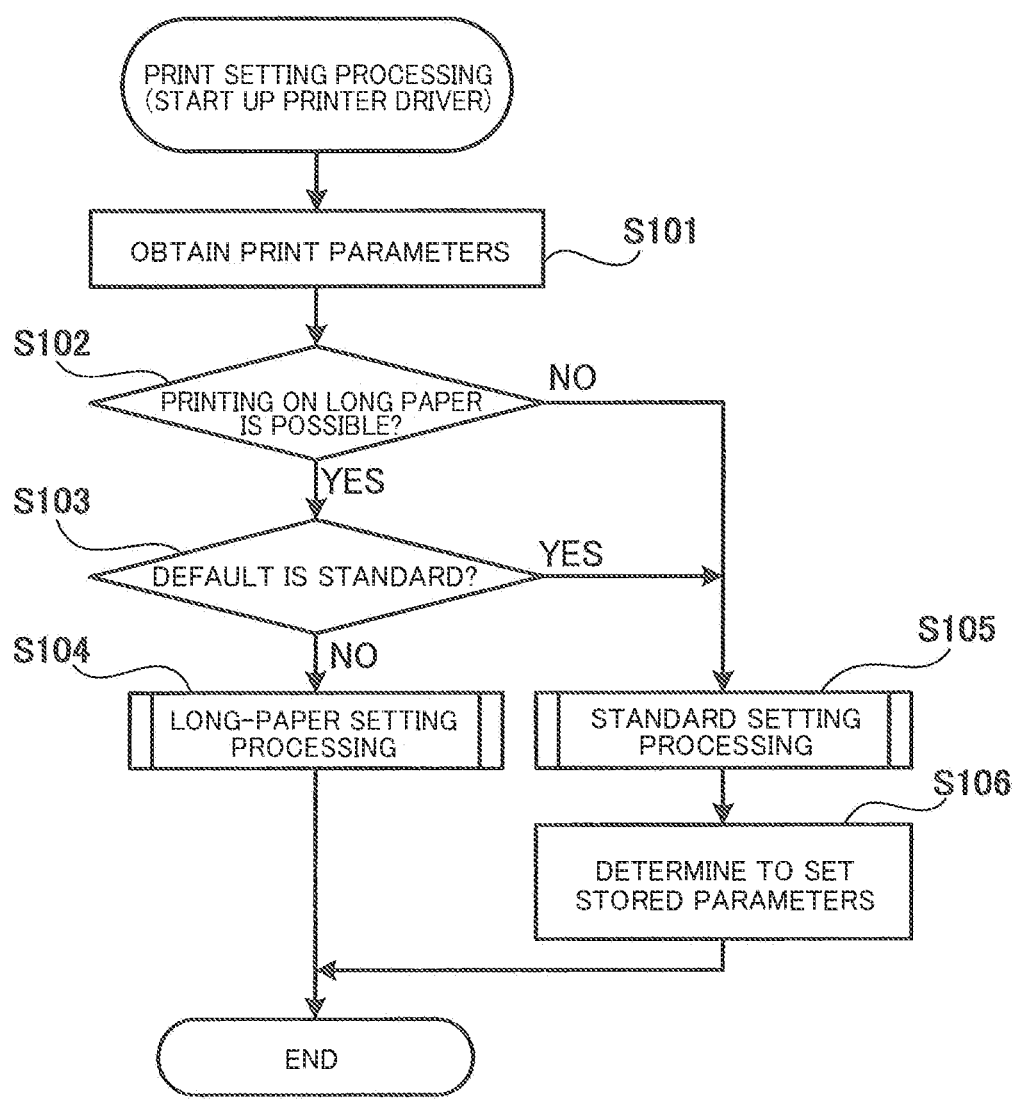
FIG. 4 is a flowchart illustrating a procedure of print setting processing.

When the standard setting processing is executed at S105 of the print setting processing illustrated in FIG. 4, the CPU 11 returns to the print setting processing after ending the standard setting processing and determines to set print parameters stored in the memory 14 at S313 of the standard setting processing as print parameters (S106). Accordingly, settings received in the standard-sheet setting screen 51 are determined as the print parameters. The determined print parameters are stored in the data structure and shared by the application such as the print application 42. When the input to the cancel button 515 is received in the standard-sheet setting screen 51, print parameters are not stored; therefore, the data structure is not updated, and parameters return to the print parameters at the time of starting the print setting processing.

Figure 5:
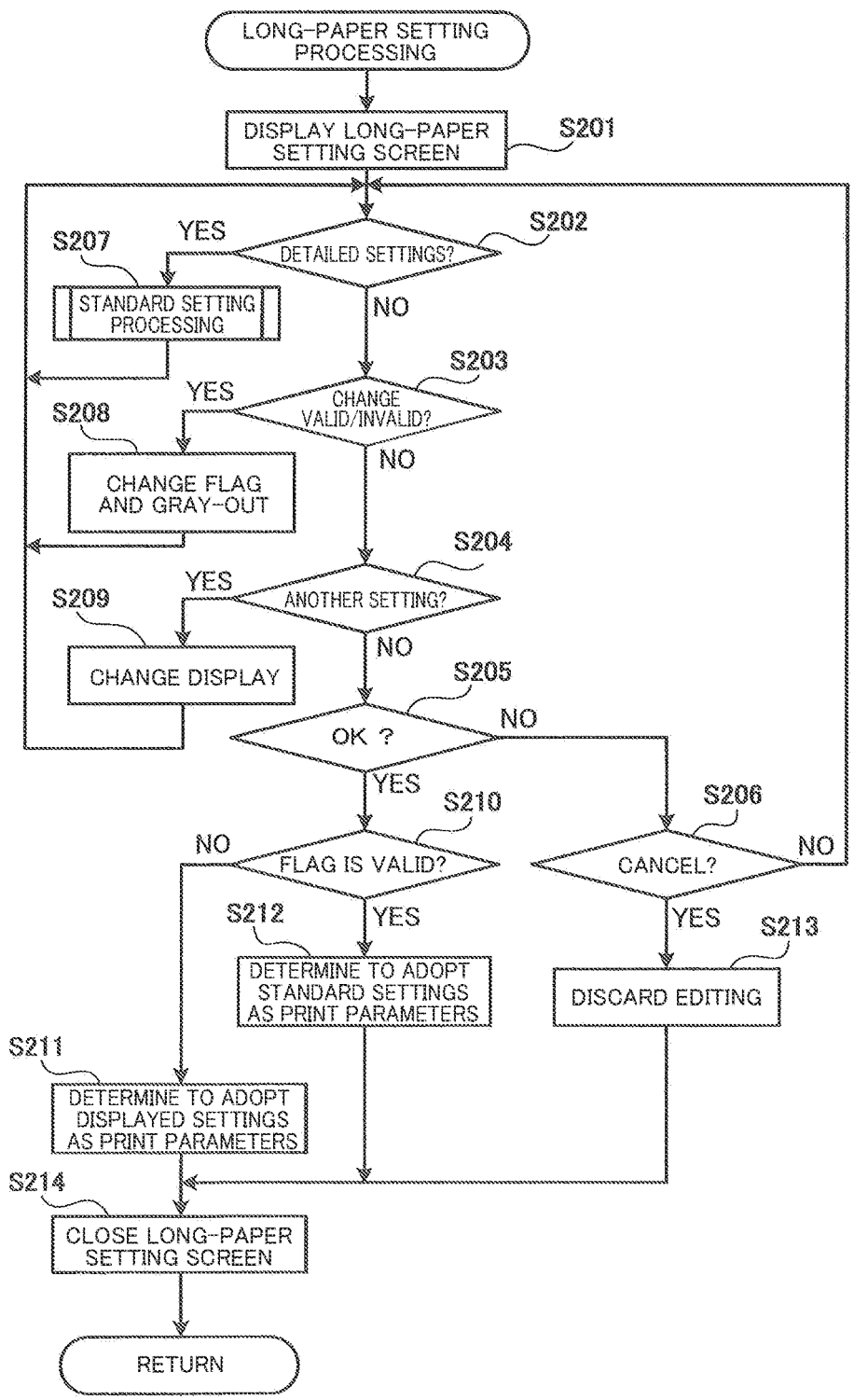
FIG. 5 is a flowchart illustrating a procedure of long-paper setting processing.

On the other hand, when the standard setting processing is executed at S207 of the long-paper setting processing illustrated in FIG. 5, the CPU 11 returns to the long-paper setting processing after ending the standard setting processing. In this case, the CPU 11 displays the long-paper setting screen 52 on the front by closing the standard-sheet setting screen 51, and receives an input to the long-paper setting screen 52 which is being displayed.

Explanation returns to the long-paper setting processing. When it is determined that the instruction for changing valid/invalid of detailed settings has been received by the input to the check box 528 on the long-paper setting screen 52 (S203: YES), the CPU 11 changes the flag indicating valid/invalid and the display manner of items for both sizes included in the displayed long-paper setting screen 52 (S208).

For example, when the detailed settings are changed from invalid to valid, the CPU 11 stores the flag indicating valid, and grays out the items for both sizes in the long-paper setting screen 52 to disable the reception of items for both sizes. The instruction for making the detailed settings valid is an example of an exclusive setting. In this case, the CPU 11 may gray out all items or does not gray out items only for the long paper at S208. It is also preferable that the items themselves are not displayed instead of gray-out display.

According to the above, the CPU 11 does not receive, for example, inputs to an item of print quality and an item of orientation of printing on the long-paper setting screen 52. It is possible to display that the settings are invalid so as to be easily recognized by the user when the items for both sizes are grayed out. It is also preferable that the input to the check box 528 is accepted only when the operation to the detail setting button 527 is received and the standard setting processing is executed.

When the instruction received at S203 is the instruction for changing the detailed settings from valid to invalid, the CPU 11 changes the flag to invalid and stores the flag at S208, releasing the gray out in the long-paper setting screen 52.

When the long-paper setting processing is started at S312 of the standard setting processing, the CPU 11 starts the long-paper setting processing in the state in which the flag indicating valid is stored and the items for both sizes in the long-paper setting screen 52 are grayed out. Also when the long-paper setting processing is started at S312 of the standard setting processing, it is preferable that the parameters displayed on the standard-sheet setting screen 51 are temporarily stored and which is set to valid is determined based on the operation to the check box 528 instead of making the detailed settings valid.

There are items in print parameters which can be received both on the standard-sheet setting screen 51 and the long-paper setting screen 52. The CPU 11 makes either of them valid based on the input to the check box 528. That is, in the case where the check box 528 is checked, the printer driver 43 makes inputs received in the standard-sheet setting screen 51 valid. Items set to valid by the input to the check box 528 may be all items received in the standard-sheet setting screen 51 or only the items for both sizes. On the other hand, in the case where the check box 528 is not checked, the printer driver 43 does not reflect print parameters edited in the standard-sheet setting screen 51 on the printing even when the standard-sheet setting screen 51 is displayed and editing of print parameters is received on the displayed standard-sheet setting screen 51.

In the case where inputs on the standard-sheet setting screen 51 are set to valid by the operation to the check box 528, settings to items for both sizes are received only on the standard-sheet setting screen 51. The operation to items for both sizes in the long-paper setting screen 52 is not received; therefore, the long-paper setting screen 52 becomes simple and is easily operated. On the other hand, in the case where inputs in the standard-sheet setting screen 51 are set to invalid, the items for both sizes are received on the long-paper setting screen 52; therefore, the labor of switching the setting screens can be saved. Since the switching between valid/invalid can be accepted, operability convenient for the user can be selected.

When it is determined that another input has been received on the long-paper setting screen 52 (S204: YES), the CPU 11 changes display in the long-paper setting screen 52 based on the received input (S209). In a case where there is an item interlocked with the received input, the selection state of the item is also changed at S209.

For example, when the selection state in the selection field for the paper type 521 is changed from a different type to the banner paper, the selection field for the sheet supply method 523 is changed to the "banner paper tray". For example, when the selection state in the selection field for the paper type 521 is changed from a different type to the rolled paper, the CPU 11 changes the selection field for the paper size 522 to the "user definition size" and the selection field for the sheet supply method 523 to the "rolled paper tray".

Then, when it is determined that the input to the OK button 524 has been received (S205: YES), the CPU 11 determines whether the flag indicates validity of the detailed settings or not (S210). When it is determined that the invalidity of the detailed settings is indicated (S210: NO), the CPU 11 determines to adopt settings displayed on the long-paper setting screen 52 as print parameters (S211). When it is determined that the validity of the detailed settings is indicated (S210: YES), the CPU 11 determines to adopt settings received on the standard-sheet setting screen 51 as print parameters (S212). The CPU 11 stores the determined print parameters in the data structure.

When it is determined that the input to the cancel button 525 has been received (S206: YES), the CPU 11 does not update the data structure and discards editing received on the long-paper setting screen 52 (S213). After any of S211, S212, and S213, the CPU 11 closes the long-paper setting screen 52 (S214), and ends the long-paper setting processing.

When the long-paper setting processing is executed at S104 of the print setting processing illustrated in FIG. 4, the CPU 11 returns to the print setting processing and ends the print setting processing after ending the long-paper setting processing. When the long-paper setting processing is executed at S312 of the standard setting processing illustrated in FIG. 6, the CPU 11 returns to the standard setting processing and ends the standard setting processing after ending the long-paper setting processing, then, returns to the print setting processing and ends the print setting processing. In this case, since S313 of the standard setting processing is not executed, print parameters are not stored in the memory 14; therefore, the CPU 11 does not update the data structure at S106.

That is, the printer driver 43 according to the embodiment includes two kinds of setting screens which are the standard-sheet setting screen 51 and the long-paper setting screen 52 and receives inputs to both screens. When the input to the OK button is received on one of the screens 51, 52, print parameters are determined based on the input received on a corresponding setting screen. When the printer driver 43 receives the instruction for executing printing in the application such as the print application 42 and a printing job is received through the OS 41, the printer driver 43 generates a printing command by using the determined print parameters.

As described in detail, the PC 1 having the printer driver 43 including the standard-sheet setting screen 51 and the long-paper setting screen 52 as in the embodiment sets the setting screen displayed first when receiving the instruction for displaying the setting screen that receives inputs of print parameters to the long-paper setting screen 52. Since the long-paper setting screen 52 does not receive items only for the standard size, the screen is simpler than the standard-sheet setting screen 51 that receives all items, and the long-paper setting screen 52 can be intuitively operated by the user who executes printing on the long paper. The PC 1 according to the embodiment displays the standard-sheet setting screen 51 when receiving the operation of instructing the display of the standard-sheet setting screen 51 during the display of the long-paper setting screen 52; therefore, user-friendliness at the time of standard printing can be also maintained.

Furthermore, the check box 528 is provided on the long-paper setting screen 52 and the user can previously determine on which setting screen 51, 52 settings of items for both sizes are made to valid in the embodiment; therefore, the setting screen can be easily used. When the input to the check box 528 is received, items for both sizes on the long-paper setting screen are grayed out; therefore, it is possible to avoid confusing the user. It is also preferable that corresponding items are not displayed instead of graying out the items. The instruction for designating the setting screen in which the items for both sizes are made to valid may be received on the standard-sheet setting screen 51 as well as received on both setting screens 51, 52.

Furthermore, items not received on the long-paper setting screen 52 are set as initial parameters in the embodiment; therefore, it is possible to avoid an error caused by print parameters not being selected.

Furthermore, the choice of the sheet supply method is automatically changed to an appropriate supply tray when the banner paper or the rolled paper is selected in the embodiment; therefore, inappropriate setting can be avoided.

Furthermore, the selection of the default setting screen to be displayed at the time of starting is received in the embodiment; therefore, the user not using printing on the long paper can also use the printing easily. In particular, the printing on the long paper is assumed to be used when the items only for the long paper is selected; therefore, the long-paper setting screen 52 is set as the default setting screen automatically or based on the selection by the user in the embodiment, which improves user-friendliness.

Furthermore, a possibility that the user desires to execute printing on the long paper is low when the long-paper setting screen 52 is switched to the standard-sheet setting screen 51 in the embodiment; therefore, items only for the long paper are not displayed in the initial display manner. Accordingly, the setting screen simpler than in the case where the setting screen containing the items only for the long paper in the initial state is displayed, which allows the user to execute the operation intuitively.

The embodiment is merely an example, and does not limit the present disclosure at all. Therefore, various modifications and alterations may naturally occur in the present invention within a scope not departing from the gist thereof. For example, two or more printers may be connected to the PC 1.

For example, the setting screen displayed at the time of starting in the initial state may be the standard-sheet setting screen 51. The check box that receives the designation of the default setting screen may be on the long-paper setting screen 52 or the designation may be received on both setting screens 51, 52. The check box that receives designation of making the inputs on the standard-sheet setting screen 51 valid may be on the standard-sheet setting screen 51 or the designation may be received on both setting screens 51, 52.

For example, after the instruction for the detailed settings is received on the long-paper setting screen 52, the display returns to the long-paper setting screen 52 when the standard-sheet setting screen 51 is closed in the embodiment; however, the present invention is not limited to this. For example, it is preferable that, when the instruction for displaying the standard-sheet setting screen 51 is received, the long-paper setting screen 52 is closed and only the standard-sheet setting screen 51 is displayed. In this case, print parameters displayed on the long-paper setting screen 52 may be reflected on the standard stetting screen 51. It is also preferable that a button for displaying the long-paper setting screen 52 is provided on the standard-sheet setting screen 51.

For example, when the tab for the long paper is provided on the standard-sheet setting screen 51, setting information may be shared between the long-paper tab screen and the long-paper setting screen 52. For example, settings of items only for the long paper may be reflected on each other between the long-paper setting screen 52 and the long-paper tab screen regardless of the state of the flag indicating valid/invalid of detailed settings. The items for both sizes may be shared or not shared. It is further preferable that all items which can be received on both the standard-sheet setting screen 51 and the long-paper setting screen 52 are shared therebetween. That is, when the display screen is changed, all settings received on the displayed setting screen are temporarily stored and are reflected on the screen to be displayed anew. That is, in respective items of print parameters, the latest inputs which have been received on either screen may be made to valid.

For example, the supply tray is automatically changed when the long paper is selected, however, it is not limited to this. It is also preferable that the selection of paper incapable of being fed is disabled when the proper supply tray is not mounted.

In arbitrary flowcharts disclosed in respective embodiments, a plurality of processing in a plurality of arbitrary steps may be arbitrarily changed in the execution order or may be executed in parallel in a range not causing discrepancy in the processing contents.

The processing disclosed in respective embodiments may be executed by a single CPU, a plurality of CPUs, hardware such as ASIC or combinations of them. The processing disclosed in the embodiment may be realized in various states such as a recording medium recording programs or methods for executing the processing.

What is claimed is:

1. A non-transitory storage medium storing a plurality of instructions readable by a computer of an information processing apparatus,
   wherein, when executed by the computer, the plurality of instructions cause the information processing apparatus to:
   display a first setting screen on a user interface of the information processing apparatus as a setting screen without displaying a second setting screen in response to receipt of a first displaying instruction for displaying the setting screen that receives inputs of print parameters through an operating system of the information processing apparatus, the first setting screen being a setting screen capable of receiving a print parameter of a first item of a plurality of setting items that relate to the print parameters and incapable of receiving a print parameter of a second item of the plurality of setting items, the second setting screen being a setting screen capable of receiving the print parameter of the first item and the print parameter of the second item of the plurality of setting items, the print parameter of the first item being used for generating printing data used for particular printing different from standard printing and being not used for generating printing data used for the standard printing, the print parameter of the second item being not used for generating the printing data used for the particular printing and being used for generating the printing data used for the standard printing, the printing data used for the particular printing being generated by using the print parameter of the first item receivable on the first setting screen; and
   display the second setting screen on the user interface instead of the first setting screen in response to receipt a second displaying instruction for displaying the second setting screen through the user interface while the first setting screen is displayed.

2. The non-transitory storage medium according to claim 1,
   wherein the first setting screen is capable of receiving the print parameter of the first item used for generating the printing data used for the particular printing and not used for generating the printing data used for the standard printing, the particular printing being printing that prints on long paper having a longer length than a standard size, the standard printing being printing that prints on the standard size sheet.

3. The non-transitory storage medium according to claim 2,
   wherein the first setting screen is capable of receiving the print parameter of the first item used for generating the printing data used for printing on the long paper and not used for generating the printing data used for the standard printing as printing on the standard size sheet, the long paper being paper having a size different from a plurality of sizes of precut paper, the standard size sheet being paper specified by selection from the plurality of sizes previously set which are the plurality of sizes of the precut paper being precut in prescribed sizes.

4. The non-transitory storage medium according to claim 3,
   wherein the first setting screen is capable of receiving the print parameter of the first item used for generating the printing data used for printing on rolled paper that is included in the long paper and not used for generating the printing data used for the standard printing as printing on the standard size sheet.

5. The non-transitory storage medium according to claim 3,
   wherein the first setting screen is capable of receiving the print parameter of the first item used for generating the printing data used for the particular printing as printing on banner paper that is included in the long paper and not used for generating printing data used for the standard printing as printing on the standard size sheet, the standard size sheet being specified by selection from the plurality of sizes that include international standard A size.

6. The non-transitory storage medium according to claim 3,
   wherein the first setting screen is capable of receiving the print parameter of the first item used for generating the printing data used for the particular printing as printing on the long paper and not used for generating the printing data used for the standard printing as printing on the standard size sheet, standard size sheet being specified by selection from the plurality of sizes that include U.S. standard letter.

7. The non-transitory storage medium according to claim 1,
wherein the first setting screen is capable of receiving at least one print parameter of a plurality of third items, the plurality of third items being setting items of the print parameters used for generating the printing data used for the particular printing and used for generating the printing data used for the standard printing, the at least one print parameter of the plurality of third items being the print parameter receivable on both the first setting screen and the second setting screen, and
wherein, when executed by the computer, the plurality of instructions cause the information processing apparatus to:
in a case where the second setting screen is displayed, receive an exclusive setting for setting whether at least one of the plurality of third items included in the first setting screen is valid or the at least one of the plurality of third items included in the second setting screen is valid;
in a case where the at least one of the plurality of third items included in the first setting screen is set to valid by the exclusive setting, obtain at least one print parameter of the plurality of the third items from the first setting screen; and
in a case where at least one of the plurality of third items included in the second setting screen is set to valid by the exclusive setting, obtain at least one print parameter of the plurality of third items from the second setting screen.

8. The non-transitory storage medium according to claim 7,
wherein, when executed by the computer, the plurality of instructions cause the information processing apparatus to:
in a case where the second setting screen is not displayed, obtain an initial parameter, as the print parameter of the second item, as the print parameter set in advance as the print parameter obtained when designation of the print parameter is not received by displaying the second setting screen.

9. The non-transitory storage medium according to claim 7,
wherein, when executed by the computer, the plurality of instructions cause the information processing apparatus to:
in a case where the second setting screen is displayed, disable receiving the at least one of the print parameters of the plurality of third items included in the first setting screen when the at least one of the plurality of third items included in the second setting screen is valid by the exclusive setting.

10. The non-transitory storage medium according to claim 1,
wherein, when executed by the computer, the plurality of instructions cause the information processing apparatus to:
when particular precut paper, as banner paper, precut to a prescribed size on which the particular printing is executable is selected as a paper type of the setting item of the print parameter on the first setting screen, change a tray receivable as a supply tray in setting items of the print parameters on the first setting screen to a tray capable of supplying the particular precut paper.

11. The non-transitory storage medium according to claim 1,
wherein, when executed by the computer, the plurality of instructions cause the information processing apparatus to:
when rolled paper is selected as a paper type of the setting item of the print parameter on the first setting screen change a tray receivable as a supply tray in setting items of the print parameters on the first setting screen to a tray capable of supplying the rolled paper; and
change a size receivable as a sheet size in setting items of the print parameters on the first setting screen to a size corresponding to the rolled paper.

12. The non-transitory storage medium according to claim 1,
wherein, when executed by the computer, the plurality of instructions cause the information processing apparatus to:
receive a start setting for selecting any one of the first setting screen and the second setting screen as a screen displayed first after the plural instructions are executed;
in response to receipt the first displaying instruction for displaying the setting screen through the operating system, display the first setting screen by the user interface without displaying the second setting screen when the first setting screen is selected by the start setting, and display the second setting screen by the user interface without displaying the first setting screen when the second setting screen is selected by the start setting.

13. The non-transitory storage medium according to claim 12,
wherein, when executed by the computer, the plurality of instructions cause the information processing apparatus to:
when the print parameter of the first items is received on the second setting screen displayed by the selection of the second setting screen by the start setting, change the start setting to starting from the first setting screen.

14. The non-transitory storage medium according to claim 12,
wherein, when executed by the computer, the plurality of instructions cause the information processing apparatus to:
when the print parameter of the first item is received on the second setting screen displayed by the selection of the second setting screen by the start setting, receive, through the user interface, a selection whether the start setting is changed to starting from the first setting screen or not; and
change the start setting to starting from the first setting screen when receiving the selection of the change.

15. The non-transitory storage medium according to claim 1,
wherein the second setting screen displayed first at the time of executing the plurality of instructions is an initial display manner in which the print parameters of the first items are not receivable, and
wherein, when executed by the computer, the plurality of instructions cause the information processing apparatus to:

when receiving an instruction for switching to a display state in which the print parameter of the first item is receivable in the initial display manner, display, on the user interface, the second setting screen in a multi-item display manner in which the print parameter of the first item is receivable.

16. An information processing apparatus comprising:

a user interface including a display device;

a memory; and a computer, wherein the computer is configured to:

display a first setting screen on a user interface of the information processing apparatus as a setting screen without displaying a second setting screen in response to receipt of a first displaying instruction for displaying the setting screen that receives inputs of print parameters through an operating system of the information processing apparatus, the first setting screen being a setting screen capable of receiving print parameters of a first item of a plurality of setting items that relate to the print parameters and incapable of receiving print a parameter of a second item of the plurality of setting items, the second setting screen being a setting screen capable of receiving the print parameter of the first item and the print parameter of the second item of the plurality of setting items, the print parameter of the first item being used for generating printing data used for particular printing different from standard printing and being not used for generating printing data used for the standard printing, the print parameter of the second item being not used for generating the printing data used for the particular printing and being used for generating the printing data used for the standard printing, the printing data used for the particular printing being generated by using the print parameter of the first item receivable on the first setting screen; and display the second setting screen on the user interface instead of the first setting screen in response to receipt a second displaying instruction for displaying of the second setting screen through the user interface while the first setting screen is displayed.

* * * * *